US005280224A

United States Patent [19]

Sagara

[11] Patent Number: 5,280,224

[45] Date of Patent: Jan. 18, 1994

[54] PROCESS CARTRIDGE DRIVE MECHANISM AND IMAGE FORMING APPARATUS

[75] Inventor: Seiji Sagara, Kawasaki, Japan

[73] Assignee: Canon Kabushiki Kaisha, Tokyo, Japan

[21] Appl. No.: 882,475

[22] Filed: May 13, 1992

[30] Foreign Application Priority Data

May 14, 1991 [JP] Japan .............................. 3-137097
Apr. 27, 1992 [JP] Japan .............................. 4-107668

[51] Int. Cl.[5] ...................... G03G 15/00; H02P 1/22

[52] U.S. Cl. .................................. 318/265; 318/10; 318/15; 318/280; 318/286

[58] Field of Search ............... 318/256, 264, 265, 266, 318/9, 10, 11, 12, 14, 15, 280, 283, 286, 373, 374, 696, 685

[56] References Cited

U.S. PATENT DOCUMENTS

| | | | |
|---|---|---|---|
| 4,549,120 | 10/1985 | Banno et al. | 318/254 |
| 4,629,949 | 12/1986 | Senso | 318/257 |
| 4,631,457 | 12/1986 | Tanuma et al. | 318/254 |
| 4,788,573 | 11/1988 | Nakaoka et al. | 355/3 CH |
| 4,802,027 | 1/1989 | Talmadge et al. | 360/60 |
| 4,833,378 | 5/1989 | Furue et al. | 318/374 |

*Primary Examiner*—Bentsu Ro
*Attorney, Agent, or Firm*—Fitzpatrick, Cella, Harper & Scinto

[57] ABSTRACT

A process cartridge drive mechanism for driving a process cartridge which is mountable to a main body of an image forming apparatus. The process cartridge drive mechanism includes a drive motor which is forwardly and reversely rotatable; a drive force transmitting device, having a range of play therein, for transmitting a drive force of the drive motor to the process cartridge; and a control device for controlling a rotation of the drive motor such that the drive motor is rotated reversely within the range of play of the drive force transmitting device before the drive motor is stopped.

30 Claims, 13 Drawing Sheets

PROCESS CARTRIDGE DRIVE MECHANISM AND IMAGE FORMING APPARATUS

BACKGROUND OF THE INVENTION

Field of the Invention

The present invention relates to a process cartridge drive mechanism, and an image forming system (image forming apparatus) using such a process cartridge drive mechanism.

Description of the Related Art

A process cartridge which is removably mountable within an image forming system is mounted within an image forming system such that a driven gear of the process cartridge is meshed with a drive gear of the image forming system. By rotatingly driving the drive gear by a drive motor, the process cartridge is driven. However, when the process cartridge is dismounted from the image forming system, it is necessary to release the meshing condition between the driven gear and the drive gear. To this end, for example, it is considered that means for rotating the drive gear reversely synchronously with the opening movement of a cover of the image forming system is provided. A process cartridge drive mechanism having such means is shown in FIGS. 1 to 3. FIG. 1 is a perspective view of the process cartridge drive mechanism, FIG. 2 is a plan view of the drive mechanism, and FIG. 3 is an elevational view of the mechanism.

First of all, an image forming system 1 has an outer cover 5 pivotally mounted on pins 4 for opening and closing movement. As shown in FIG. 1, in a condition that the outer cover 5 is opened, a process cartridge 20 is mounted within the image forming system. Incidentally, a drum gear 23 acting as a driven gear is mounted on one end of a photosensitive drum 22 disposed in the process cartridge 20.

On the other hand, as shown in FIG. 1, the image forming system includes a drive motor 6. A small motor gear 7 fixed to an output shaft of the drive motor 6 is meshed with a large diameter gear 10*a* of a reduction gear 10 (which also includes a small diameter gear 10*b* integral with the large diameter gear). The small diameter gear 10*b* of the reduction gear 10 is meshed with a large diameter idler gear 11 which is in turn meshed with a clutch gear 12 which is slidably mounted on a drive shaft 13. Further, a clutch boss 14 (FIG. 2) is provided on an outer end of the drive shaft 13 in contact with the clutch gear 12, and a drive gear 3 is provided on an inner end of the drive shaft 13. Further, as shown in FIG. 2, a control ring 17 is loosely mounted around the clutch gear 12 and the clutch boss 14 via a clutch spring 16. One end 16*a* of the clutch spring 16 is fixed to the control ring 17 and the other end 16*a* is fixed to the clutch boss 14. Incidentally, when a rotational driving force from the drive motor 6 acts on the clutch spring 16, the latter is contracted to reduce its diameter.

The reduction gear 10 and the idler gear 11 are supported by a support plate 18. A release lever 19 is slidably mounted on an inner surface of the support plate 18 via a pin/slot connection for sliding movement in a direction shown by the arrow in FIG. 1. The release lever 19 has an end portion 19*a* adapted to be abutted against an abutment portion 15*a* of the outer cover 5 when this outer cover is closed, and a pawl portion 19*b* adapted to be selectively engaged by the control ring 17, and is always biased, by a return spring 15, toward a dismounting direction for the process cartridge 20. Incidentally, in a condition that the outer cover 5 is opened, the pawl portion 19*b* of the release lever 19 is engaged by the control ring 17 by a spring force of the return spring 15.

As shown in FIG. 1, in the condition that the outer cover 5 is opened, the process cartridge 20 is shifted in a direction shown by the arrow in FIG. 1 while guiding positioning projections 21 formed on both ends of the cartridge along guide grooves (not shown) formed in the image forming system 1. In this way, the process cartridge 20 is mounted within the image forming system 1 at a predetermined position. In this case, the drum gear 23 of the process cartridge 20 is meshed with the drive gear 3 of the image forming system 1. Thereafter, as shown in FIGS. 2 and 3, when the outer cover 5 is closed, the abutment portion 15*a* of the cover 5 shifts the release lever 19 in a direction shown by the arrow shown in FIG. 3 in opposition to the biasing force of the return spring 15. Consequently, the pawl portion 19*b* of the release lever 19 is disengaged from the control ring 17, thus permitting the operation of the process cartridge 20 (photosensitive drum 22).

When the process cartridge 20 is dismounted from the image forming system 1, since the pawl portion 19*b* of the release lever 19 is disengaged from the control ring 17 as mentioned above, the drive gear 3 can be rotated reversely at least by an amount required for dismounting the process cartridge 20 from the image forming system, thus permitting the easy dismounting of the process cartridge 20.

However, in the above-mentioned process cartridge drive mechanism, it is necessary provide the clutch mechanism and the associated mechanical parts for the mounting and dismounting operation of the process cartridge, and results in a low frequency of performance. This makes the image forming system expensive, and limits the inner space of the image forming system in design, particularly in the smallsized systems.

The present invention aims to improve over the above-mentioned conventional techniques.

SUMMARY OF THE INVENTION

An object of the present invention is to provide a process cartridge drive mechanism and an image forming system, which permit the easy dismounting of the process cartridge from the image forming system.

Another object of the present invention is to provide a process cartridge drive mechanism and an image forming system, which can remarkably enhance the operability of the mounting and dismounting of the process cartridge.

Another object of the present invention is to provide a process cartridge drive mechanism and an image forming system, wherein the process cartridge can easily be dismounted from the image forming system with a simple construction and without cost increases. Additionally, the process cartridge can be precisely positioned and held securely within the image forming system during the normal image formation.

DETAILED DESCRIPTION OF THE PREFERRED EMBODIMENTS

In a process cartridge drive mechanism for an image forming system according to an embodiment of the present invention described hereinbelow, when a process cartridge mountable within an image forming system is mounted within the image forming system, a driven gear of the process cartridge is meshed with a drive gear of the image forming system and the process cartridge is driven by rotatingly driving the drive gear by means of a drive motor. This mechanism is so controlled that, when it is desired to stop the drive gear, it is stopped after it is rotated reversely by a predetermined amount.

According to the illustrated embodiment, whenever the normal image forming operation is finished, the drive motor is stopped after it is reversely rotated by the predetermined amount. Thus, when the process cartridge is dismounted from the image forming system, it is possible to reversely rotate only the drive gear of the image forming system, thus permitting the easy dismounting of the process cartridge. Further, a direction of a force acting on a surface of a tooth of the driven gear is aligned to a mounting direction of the process cartridge. Thus, in the image forming operation wherein the drive motor is being driven, the process cartridge is urged toward the mounting direction of the cartridge, thereby surely positioning the cartridge within the image forming system and holding it therein.

Now, a preferred embodiment of the present invention will be explained with reference to the accompanying drawings.

Figure 1:
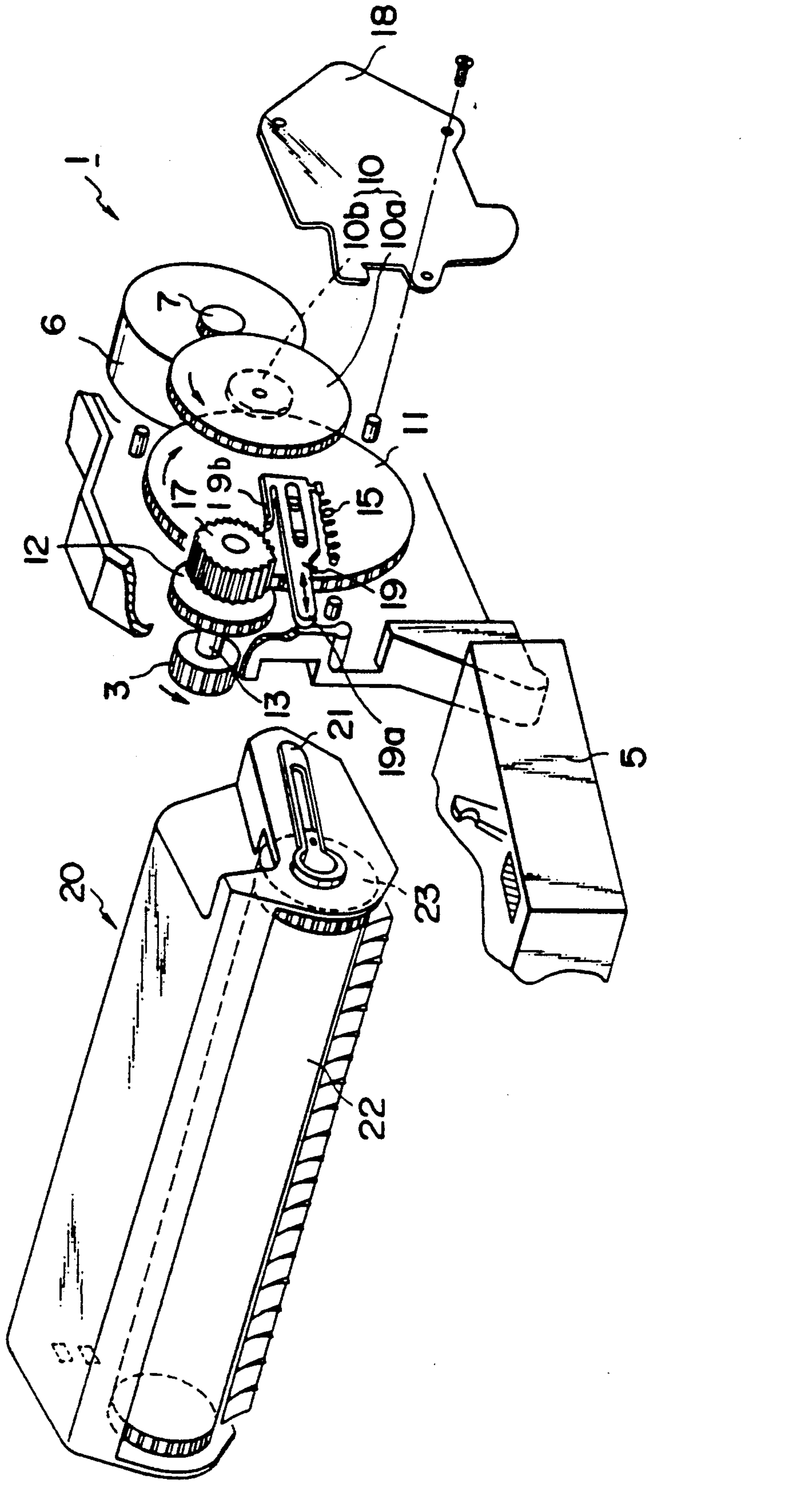
FIG. 1 PRIOR ART
FIG. 1 is a perspective view of a conventional process cartridge drive mechanism.
Figure 2:
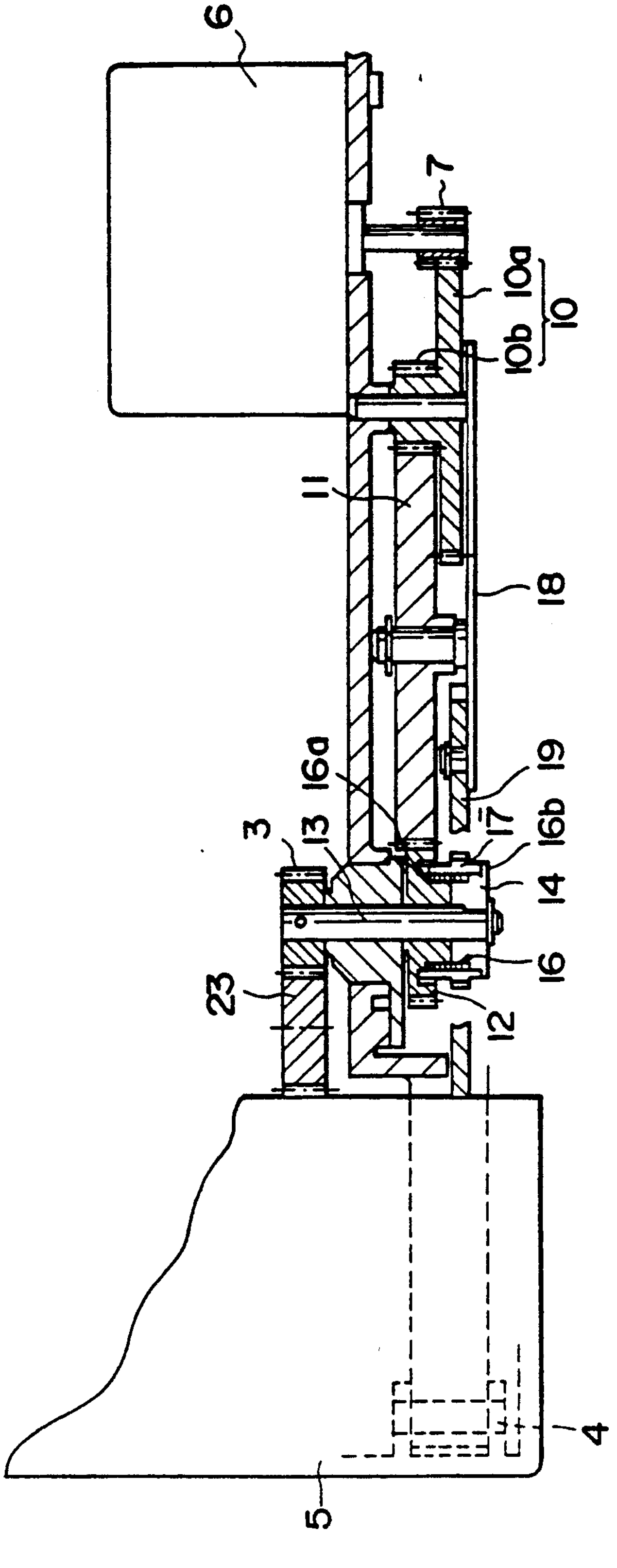
FIG. 2 PRIOR ART
FIG. 2 is a plan view of the conventional process cartridge drive mechanism of FIG. 1.
Figure 3:
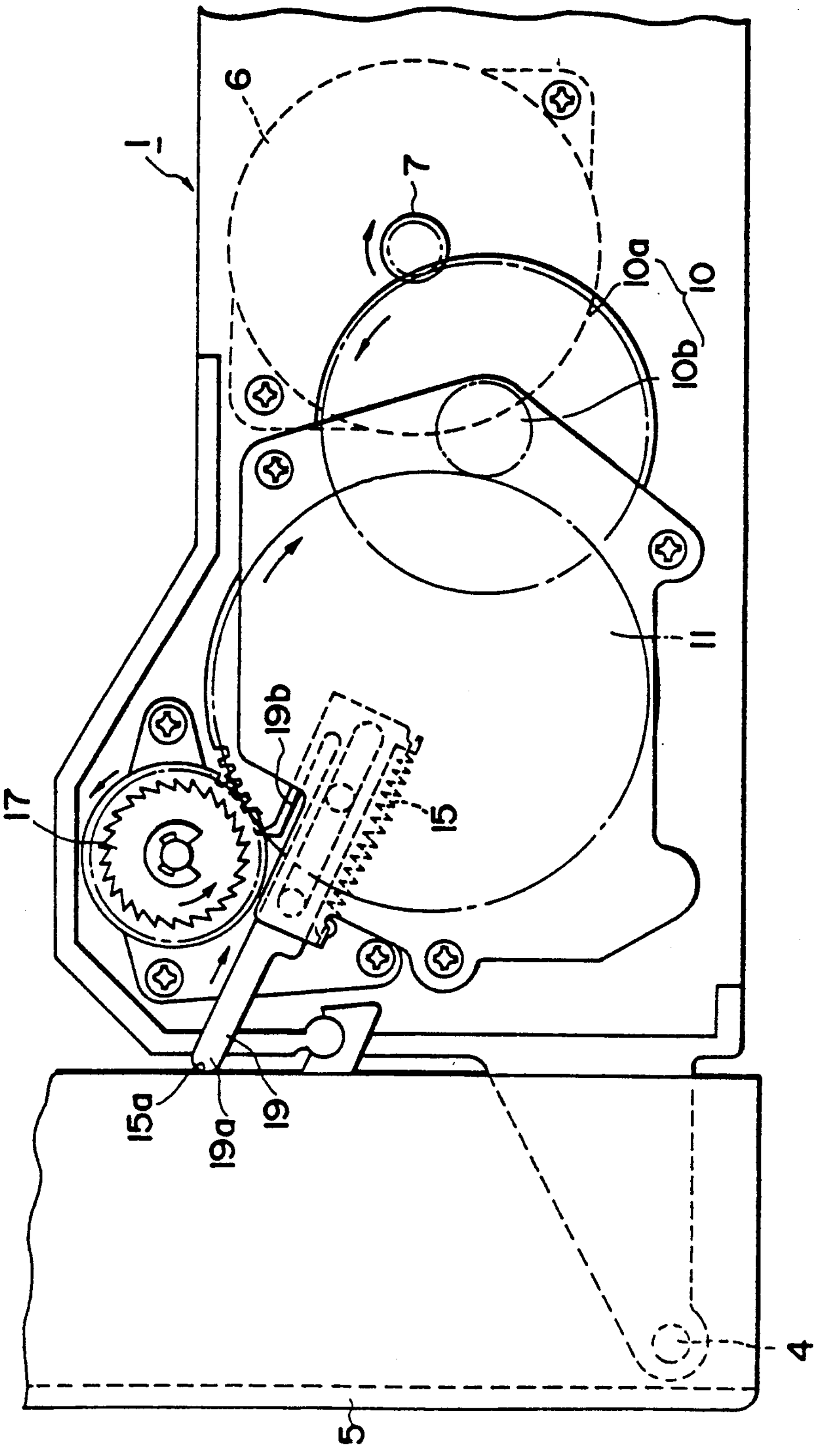
FIG. 3 PRIOR ART
FIG. 3 is an elevational view of the conventional process cartridge drive mechanism of FIG. 1.
Figure 4:
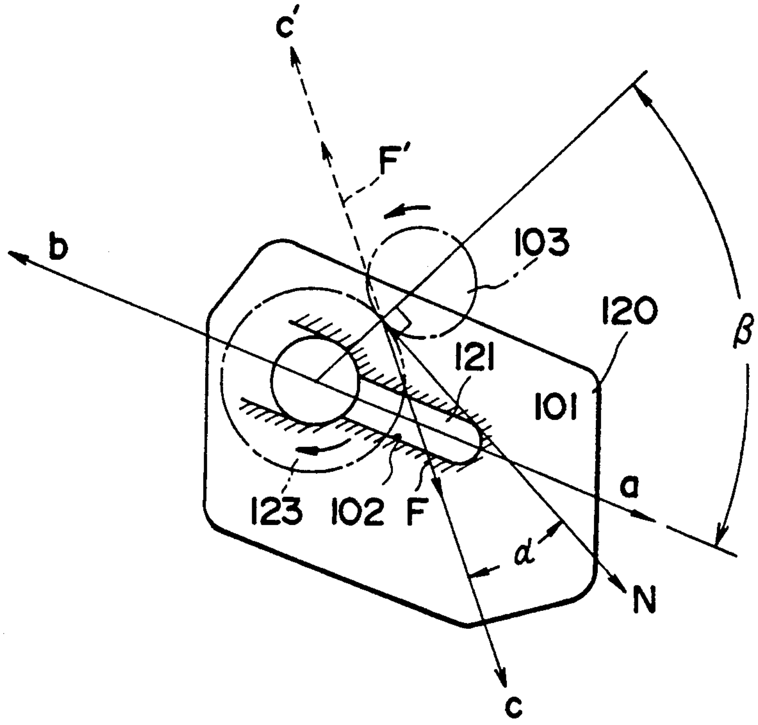
FIG. 4 is a conceptional view of a process cartridge drive mechanism according to a preferred embodiment of the present invention.
Figure 5:
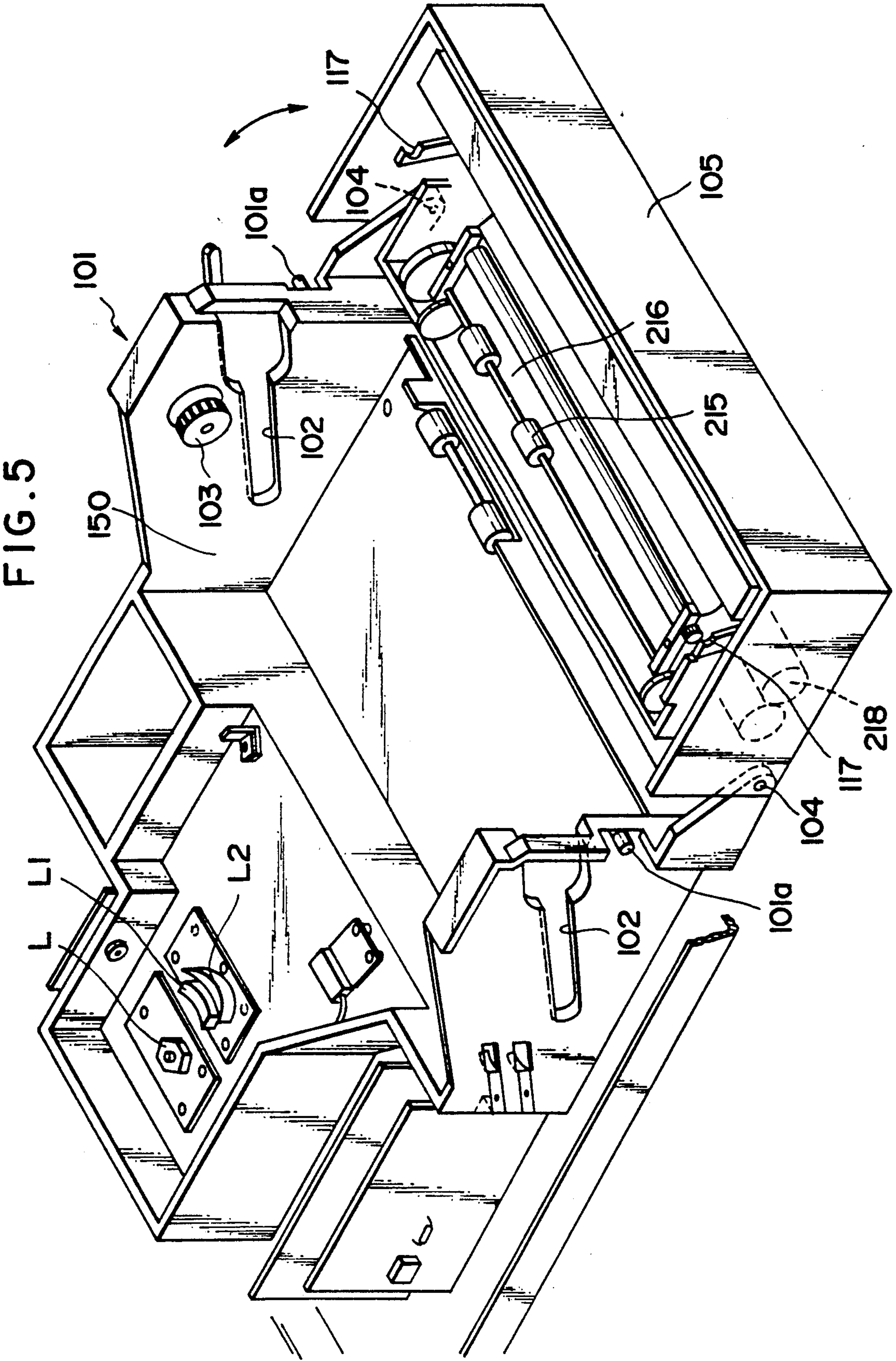
FIG. 5 is a perspective view of a laser beam printer according to a preferred embodiment of the present invention.
Figure 6:
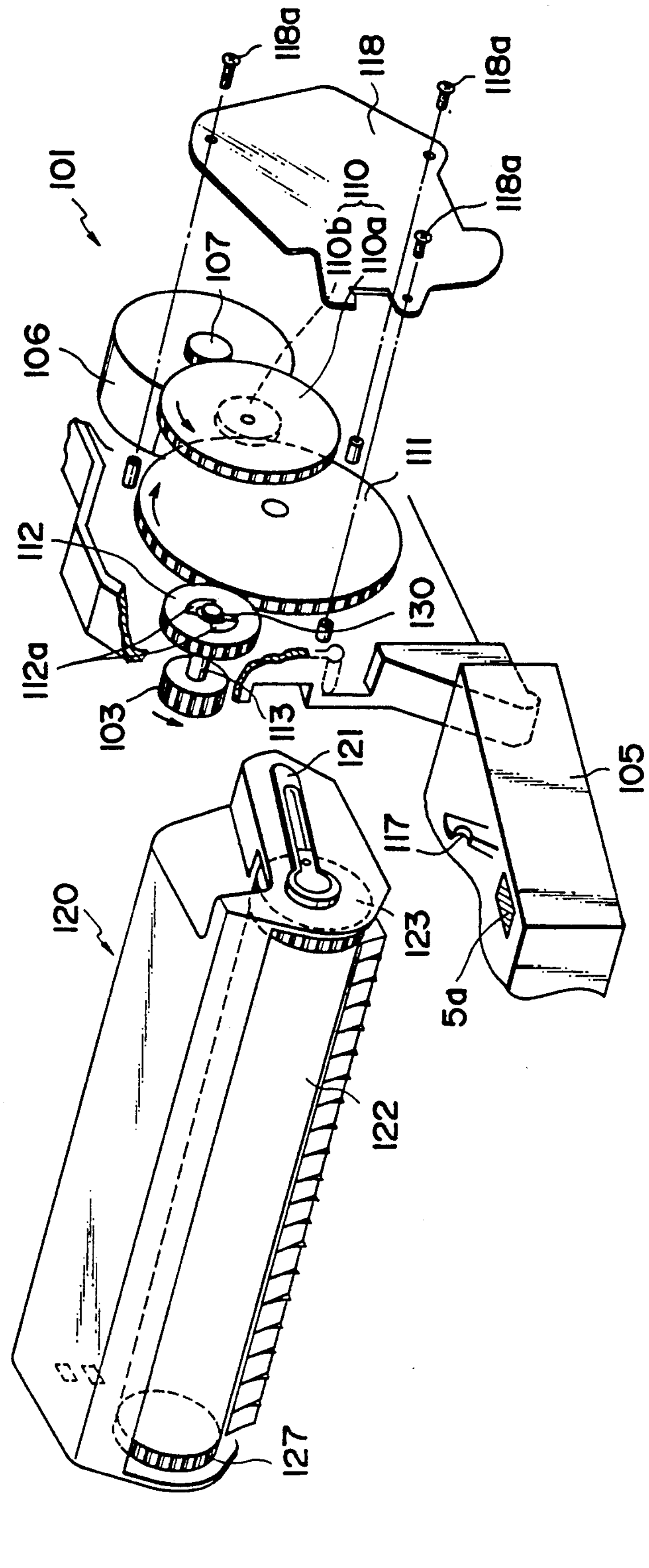
FIG. 6 is a perspective view of a process cartridge drive mechanism according to a preferred embodiment of the present invention.
Figure 7:
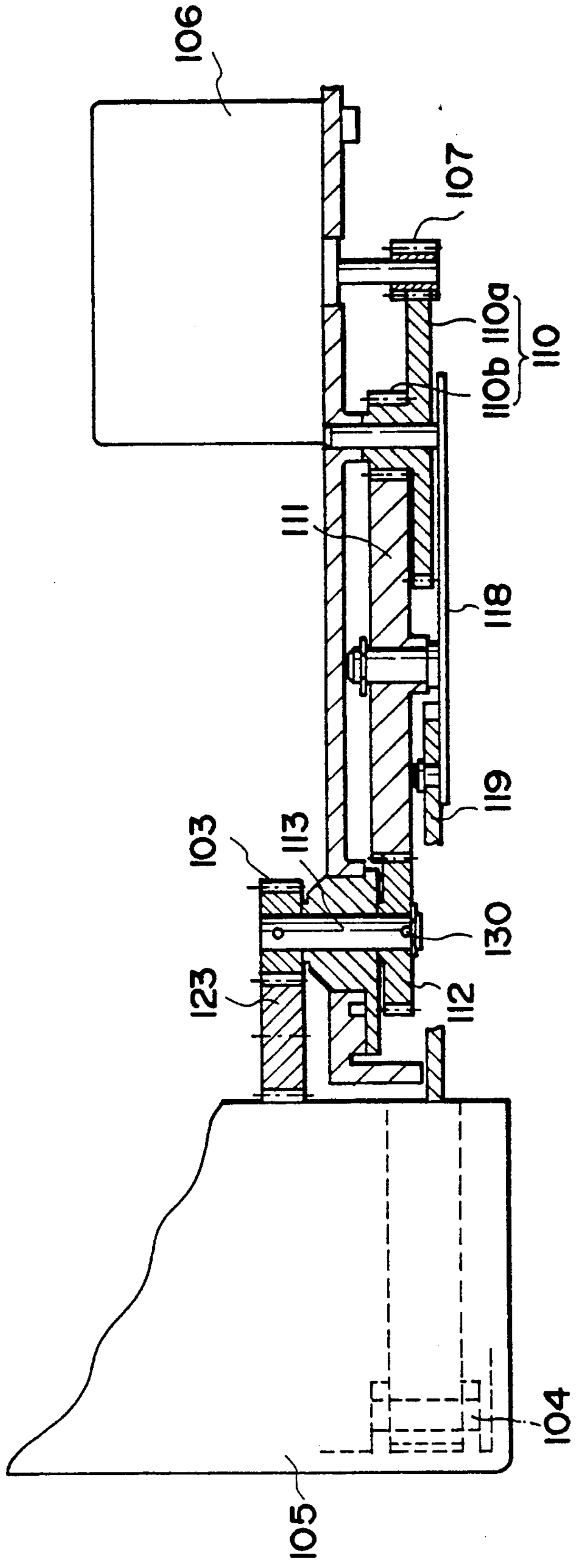
FIG. 7 is a plan view of the process cartridge drive mechanism of FIG. 6.
Figure 8:
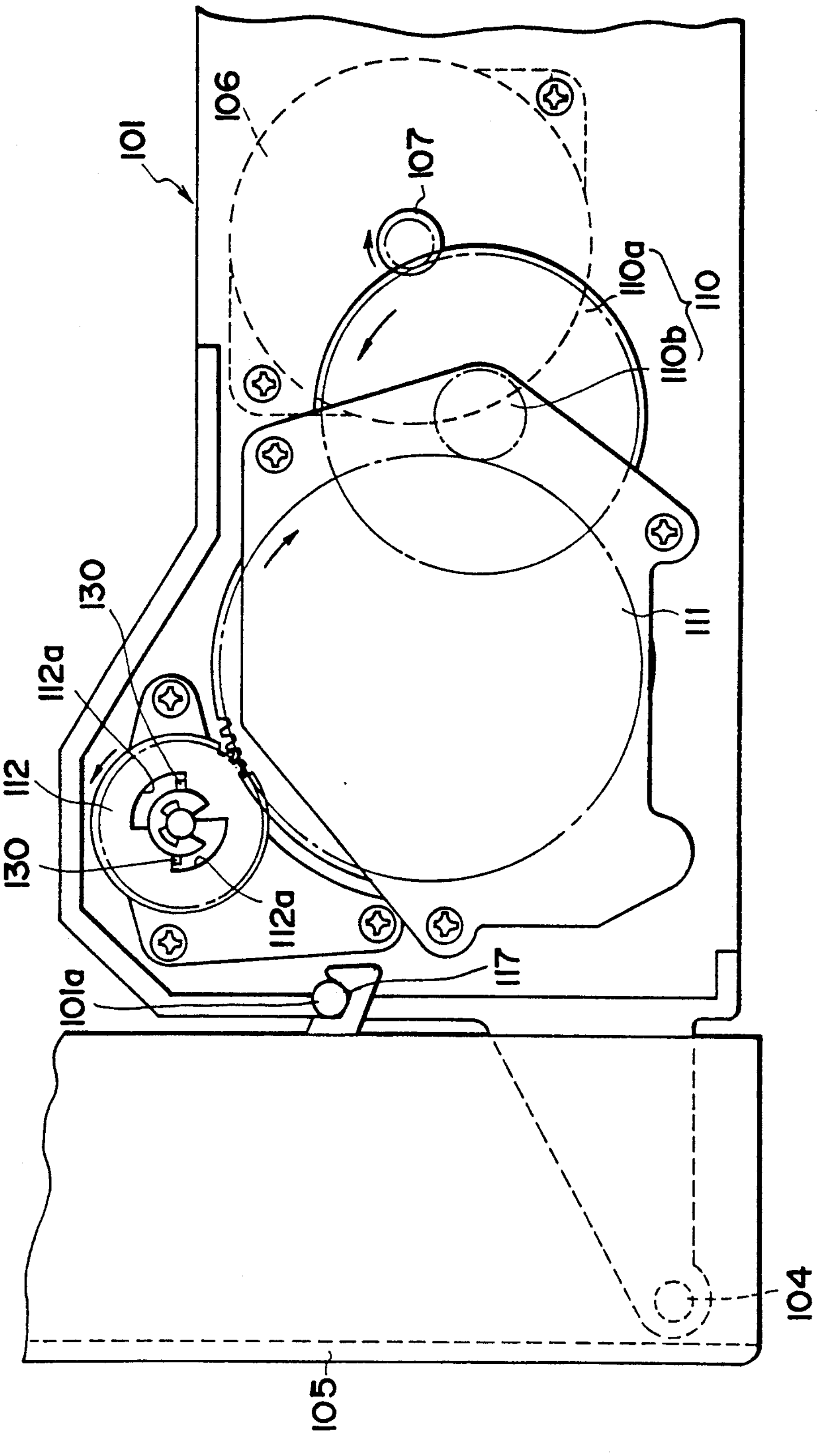
FIG. 8 is an elevational view of the process cartridge drive mechanism of FIG. 6.
Figure 9:
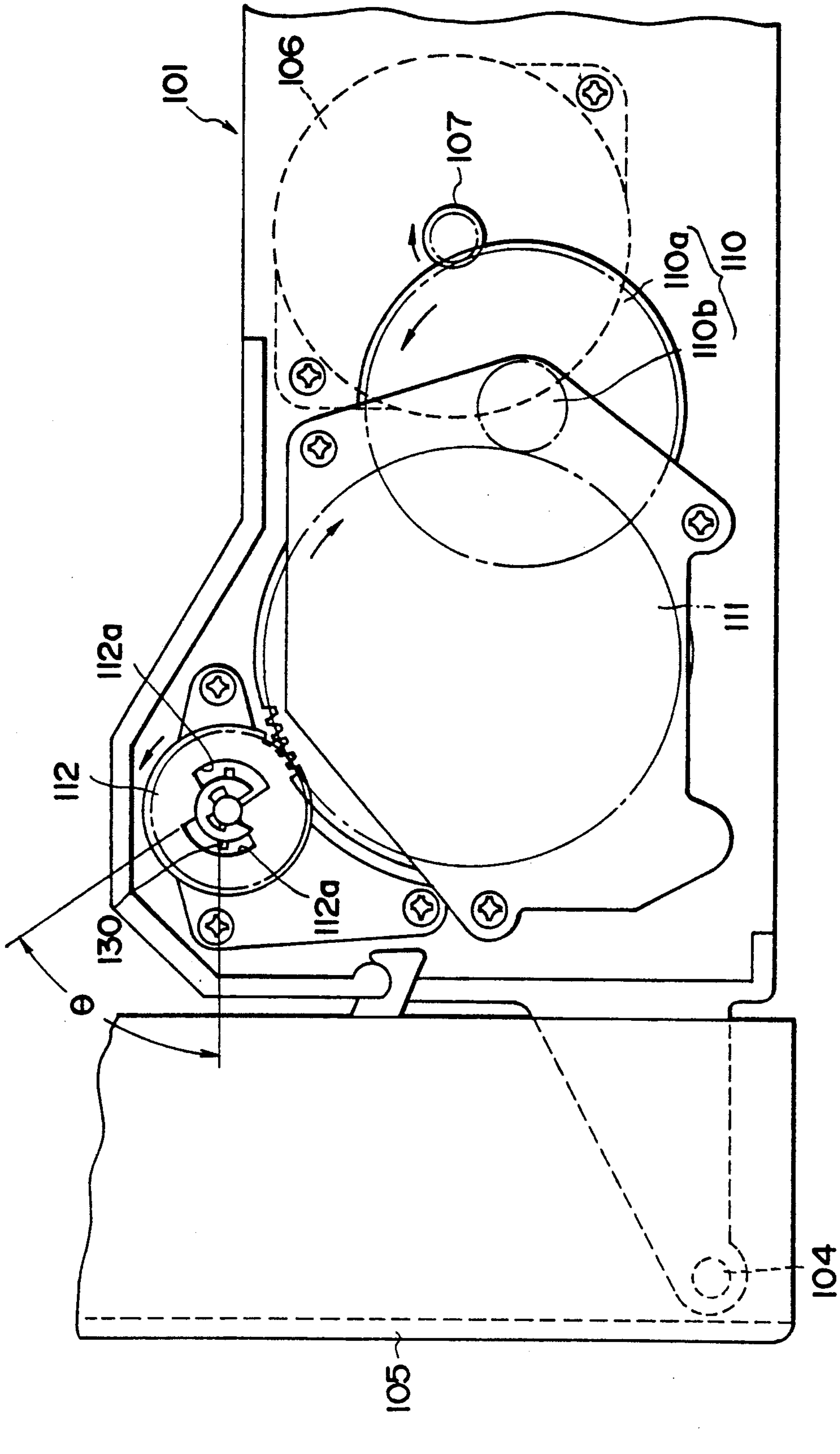
FIG. 9 is a view similar to FIG. 8, but showing another condition.

FIG. 4 is a conceptional view of a process cartridge drive mechanism according to a preferred embodiment of the present invention, FIG. 5 is a perspective view of a laser beam printer having such process cartridge drive mechanism, FIG. 6 is a perspective view of the process cartridge drive mechanism, FIG. 7 is a plan view of the process cartridge drive mechanism, and FIGS. 8 and 9 are elevational views of the process cartridge drive mechanism.

As shown in FIG. 5, a laser beam printer 101 is provided at both of its lateral sides with guide grooves 102 for guiding a process cartridge 120 shown in FIG. 6 during the mounting and dismounting of the cartridge. Further, a drive gear 103 is provided within the image forming system 101 near one of the lateral sides thereof. A outer cover 105 is pivotally mounted on the image forming system 101 via pivot pins 104 for opening and closing movement. Incidentally, FIG. 5 shows a condition that the outer cover 105 is opened, in which the process cartridge 120 can be mounted within the image forming system. Further, the outer cover 105 may be held in a closed condition by elastically locking recessed portions 117 formed in the outer cover on pins 101*a* of the image forming system 101. Further, when an operator pulls the cover 105 from the image forming system, the locking condition is released to open the cover.

As shown in FIG. 6, the process cartridge 120 is provided at both of its lateral sides with positioning projections 121 to be inserted into the corresponding guide grooves 102 of the image forming system 101. Further, a photosensitive drum 122 housed in the process cartridge 120 along its widthwise direction is provided at its one end with a drum gear 123 acting as a driven gear. Incidentally, a transfer roller gear 127 for rotating a transfer roller 217 of the image forming system 101 is provided at the other end of the photosensitive drum 122.

On the other hand, as shown in FIG. 6, the image forming system 101 includes a drive motor 106. A small motor gear 107 fixed to an output shaft of the drive motor 106 is meshed with a large diameter gear 110*a* of a reduction gear 110 (which also includes a small diameter gear 110*b* integral with the large diameter gear). The small diameter gear 110*b* of the reduction gear 110 is meshed with a large diameter idler gear 111 which is in turn meshed with a small diameter gear 112. The gear 112 is rotatably mounted on a drive shaft 113 for rotation by a predetermined angle. That is to say, as shown in FIG. 8, the gear 112 is provided with recesses 112*a* so that the gear 112 can be rotated with respect to the drive shaft 113 within a range that pins 130 protruded from the drive shaft 113 can shift within the recesses 112*a*. Further, the drive gear 103 is provided on the other end of the drive shaft 113. Incidentally, the reduction gear 110 and the idler gear 111 are supported by a support plate 118 secured to the image forming system by screws 118*a*.

As shown in FIG. 5, after the outer cover 105 is opened around the pins 104, by shifting the process cartridge 120 in a direction shown by the arrow a in FIG. 4 while inserting the positioning projections 121 of the process cartridge 120 into the guide grooves 102 of the image forming system 101, the process cartridge 120 is mounted within the image forming system 101 at a predetermined mounting position 150. In this condition, the drum gear 123 of the process cartridge 120 is meshed with the drive gear 103 of the image forming system 101.

In the above-mentioned condition, when the drive motor 106 of the image forming system 101 is energized, a rotational force of the drive motor 106 is transmitted to the gear 112 through the motor gear 107, reduction gear 110 and idler gear 111, thus rotating the gear 112 in a direction shown by the arrow d in FIG. 8. When the gear 112 is rotated in this way, as shown in FIG. 8, the recesses 112*a* formed in the gear 112 are engaged by the parallel pins 130. As a result, the rotation of the gear 112 is transmitted to the drive shaft 113 via the parallel pins 130, and the rotation of the drive shaft 113 is transmitted to the drum gear 123 of the process cartridge 120 via the drive gear 103. Consequently, the photosensitive drum 122 and the like (see FIG. 6) in the process cartridge 120 are rotatingly driven to perform the required image formation (incidentally, in the illustrated embodiment, a developing sleeve D1 is rotatingly driven via a sleeve gear (not shown) meshed with the drum gear 123). Now, in this embodiment, as shown in FIG. 4, a direction (shown by the arrow c in FIG. 4) of a force F acting on a surface of a tooth of the drum gear 123 is offset by a gear pressure angle $\alpha$ from a line N perpendicular to a line connecting between centers of the drum gear 123 and of the drive gear 103. The direction is directed toward a mounting direction (shown by the arrow a in FIG. 4) for the process cartridge 120. Thus, when the drive motor 106 is energized to perform the image formation, the process cartridge 120 is urged toward the mounting direction, thus stabilizing the mounting position of the cartridge. Incidentally, as shown in FIG. 4, when an angle between the position of the drive gear 103 and the mounting direction for the process cartridge 120 is $\beta$, this angle $\beta$ satisfies the relation $\alpha<\beta<90°$.

On the other hand, when the process cartridge 120 is desired to be dismounted from the image forming system 101, as shown in FIGS. 5 and 6, the outer cover 105 is opened and the process cartridge 120 may be retracted in a direction shown by the arrow b in FIG. 4 (dismounting direction for the process cartridge 120). However, as shown in FIG. 8, if the operator tries to retract or pull the process cartridge in a condition that the recesses 112*a* of the gear 112 are still engaged by the parallel pins 130, the reverse rotation of the drive gear 103 is prevented by the engagement between the recesses 112*a* and the parallel pins 130. Accordingly, in this condition, it is very difficult to dismount the process cartridge 120 from the image forming system.

To avoid this, in the illustrated embodiment, whenever each image forming operation is finished, the drive motor 106 is so controlled that it is stopped after it is rotated reversely by a predetermined amount. When the drive motor 106 is so rotated reversely by the predetermined amount, as shown in FIG. 9, only the gear 112 is rotated in a direction shown by the arrow by an angle $\theta$ while keeping the parallel pins 130 and the drive shaft 113 stationary. Accordingly, in the condition shown in FIG. 9, when the process cartridge 120 is retracted, the drive gear 103 is rotated reversely by the angle $\theta$ together with the drive shaft 113 and the parallel pins 130, and, thus, the process cartridge 120 can easily be dismounted from the image forming system 101. Incidentally, when a stepping motor is used as the drive motor 103 as in the illustrated embodiment, it is easy to rotate the motor reversely by the predetermined amount. Further, in the illustrated embodiment, by providing the recesses 112*a* in the gear 112, the reverse rotational force of the drive motor 103 is prevented from being transmitted to the parallel pins 130 and the drive shaft 113. Thus, the process cartridge 120 is prevented from being shifted in the dismounting direction along the guide grooves 102 of the image forming system 101, thereby avoiding the damage of the process cartridge itself and/or any parts opposing the cartridge. Further, it is possible to prevent the scattering of the toner from a developing device D and a cleaner C in the process cartridge 120 due to the reverse movement of the process cartridge 120.

Incidentally, in the illustrated embodiment, the play in the reverse rotational direction is provided in the drive gear 103 so as to prevent the reverse rotation of the drive gear 103 when the drive motor 106 is rotated reversely by the predetermined amount. Accordingly, in this embodiment, it is preferable that the amount of the reverse rotation of the motor 106 is limited within the range of the play. However, the present invention is not limited to this. Further, the various gears may be made of metal, resin or the like, for example.

As mentioned above, according to the illustrated embodiment, it is possible to easily dismount the process cartridge 120 with a simple construction and without cost increases. Further, during the normal image forming operation, it is possible to surely precisely position the process cartridge along the guide grooves 102 and hold it securely at the positioned condition.

Incidentally, typically it cannot be foreseen when the operator will exchange the process cartridge 120. Thus, fundamentally, it is desirable to effect the reverse rotation of the drive motor 106 whenever the operation of the drive motor 106 is finished. For example, whenever the printing operation is finished or whenever a warming-up rotation of the motor is finished or whenever the system is stopped at the detection of the abnormity such as the sheet jam, the drive motor is preferably rotated reversely.

Figure 10:
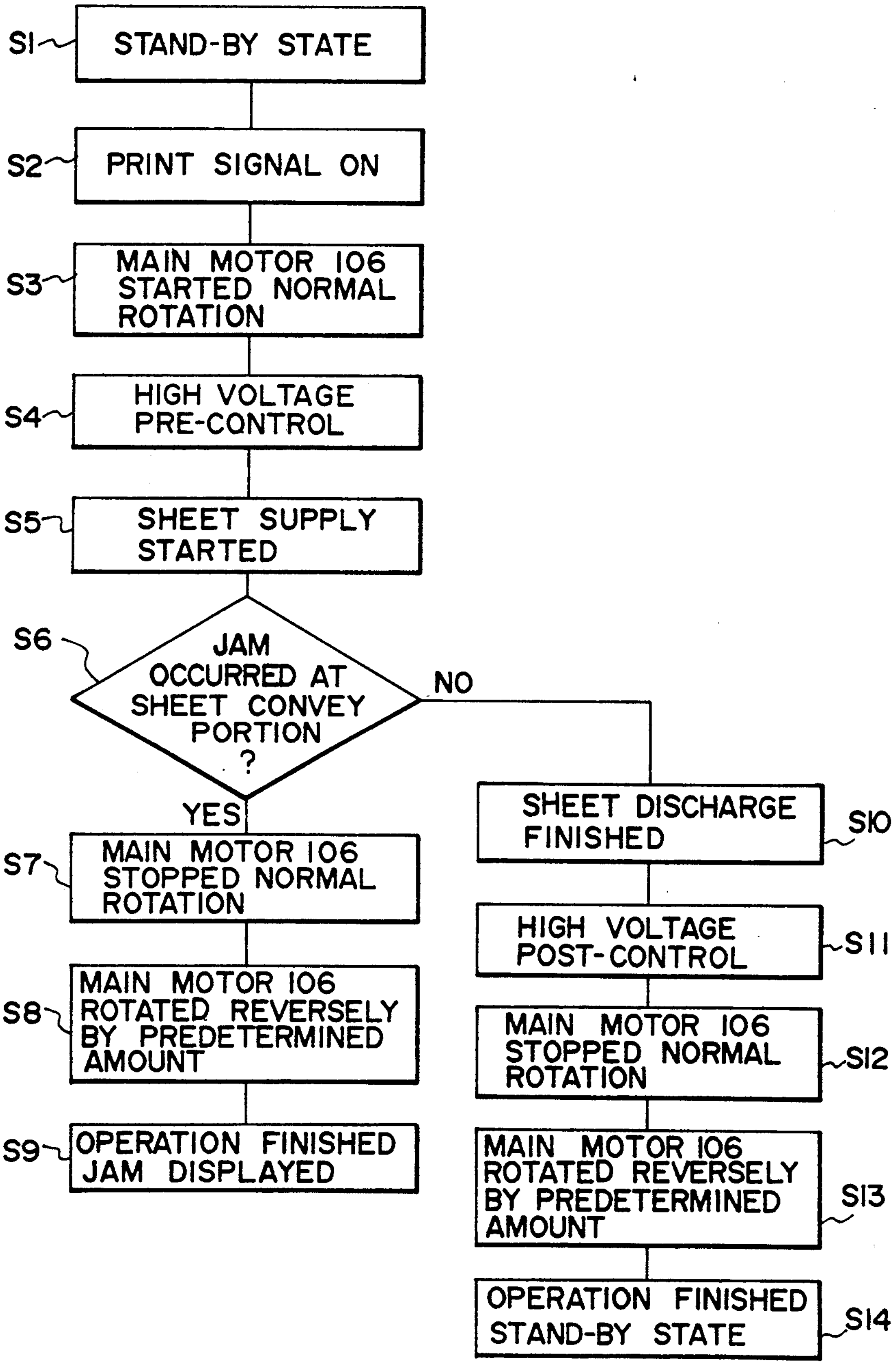
FIG. 10 is a flow chart showing an operation in an embodiment of the present invention.

FIG. 10 shows a flow chart regarding the operation effected from a stand-by condition (condition that the system is waiting for the print signal after the power source of the system has been turned ON), according to the illustrated embodiment. In response to the print signal, the main motor (drive motor) 106 starts to rotate normally for performing the printing operation. When the normal printing operation is finished or when the main motor 106 is stopped due to the occurrence of the abnormity such as the sheet jam, after the normal rotation of the main motor 106 is finished, the latter is rotated reversely by the predetermined amount and then is stopped. As a result, in any case, the drive gear 103 and the drive shaft 113 can freely be rotated by a given amount with respect to the gear 112, thus greatly improving the mounting and dismounting ability of the process cartridge 120. Incidentally, "high voltage pre-control" and "high voltage post-control" included in the flow chart are required for the electrophotography and are effected during the normal rotation of the main motor; but, these controls do not constitute the gist of the present invention. However, these controls are shown on behalf of various controls required for the printing operation. That is to say, the various controls are effected during the normal rotation of the main motor 106, and, thus, the control of the reverse rotation of the main motor 106 by the predetermined amount according to this embodiment may be merely added to the conventional necessary controls. Accordingly, such control for the main motor can easily be performed.

Now, the above-mentioned flow chart regarding the operation effected from the stand-by condition according to the illustrated embodiment will be fully explained with reference to FIG. 10.

First of all, in the stand-by condition (step S1), when the print signal is turned ON or emitted (step S2), the main motor 106 starts to be rotated in the normal direction (step S3). During the normal rotation of the main motor 106, the high voltage pre-control is effected (step S4) and the sheet supply operation is started (step S5). Then, if the jam condition is detected on the basis of a signal from a jam sensor 201 (FIG. 12)(step S6), the normal rotation of the main motor 106 is stopped (step S7). Thereafter, the main motor 106 is rotated reversely by a predetermined amount corresponding to a predetermined number of pulses via a counter 209 and then is stopped (step S8). Then, the operation is finished and the jam condition is displayed (step S9).

Incidentally, when the image forming process is finished without any trouble or abnormity such as the sheet jam, a recording sheet on which an image was recorded is discharged or ejected (step S10). Then, the high voltage post-control is effected (step S11), and thereafter, the normal rotation of the main motor 106 is stopped (step S12). Then, the main motor 106 is rotated reversely by a predetermined number of pulses via the counter 209 and is then stopped (step S13). Then, the operation is finished and the stand-by state or condition is restored again (step S14).

Next, a flow chart regarding the operation effected when the power source is switched ON and when the jam treatment is reset, according to this embodiment, will be explained with reference to FIG. 11.

Incidentally, also in this case, since the main motor may be rotated reversely by a predetermined amount after the normal rotation of the main motor is finished in all cases, the operability of the process cartridge 120 can be improved. In this way, the illustrated embodiment can be applied to all cases which can be detected or recognized by the system including the sheet jam.

However, if the power source is turned OFF suddenly during the printing operation for some reason, the illustrated embodiment may not provide as many advantages; however, since the operator seldom exchanges the process cartridge in such a condition, and since the advantage of the illustrated embodiment can be restored immediately after the power source is switched ON again, there is substantially no problem.

Returning to FIG. 11, the power source is switched ON (jam reset)(step Sl). As a result, the main motor starts to be rotated in the normal direction (step S2). During the normal rotation of the main motor 106, the high voltage pre-control is effected (step S3). Then, it is judged whether the print signal exists or not (step S4). If the print signal exists, steps the same as the steps S5–S15 shown in FIG. 10 are effected. On the other hand, if it is judged that the print signal does not exist (step S4), the high voltage post-control is effected (step S15) and then the normal rotation of the main motor is stopped (step S16). Thereafter, the main motor 106 is rotated reversely by the predetermined number of pulses via the counter 209 and is then stopped (step S17). Then, the operation is finished and the stand-by state or condition is restored again (step S18).

Next, a schematic block diagram regarding the above-mentioned embodiment will be explained with reference to FIG. 12.

Figure 11:
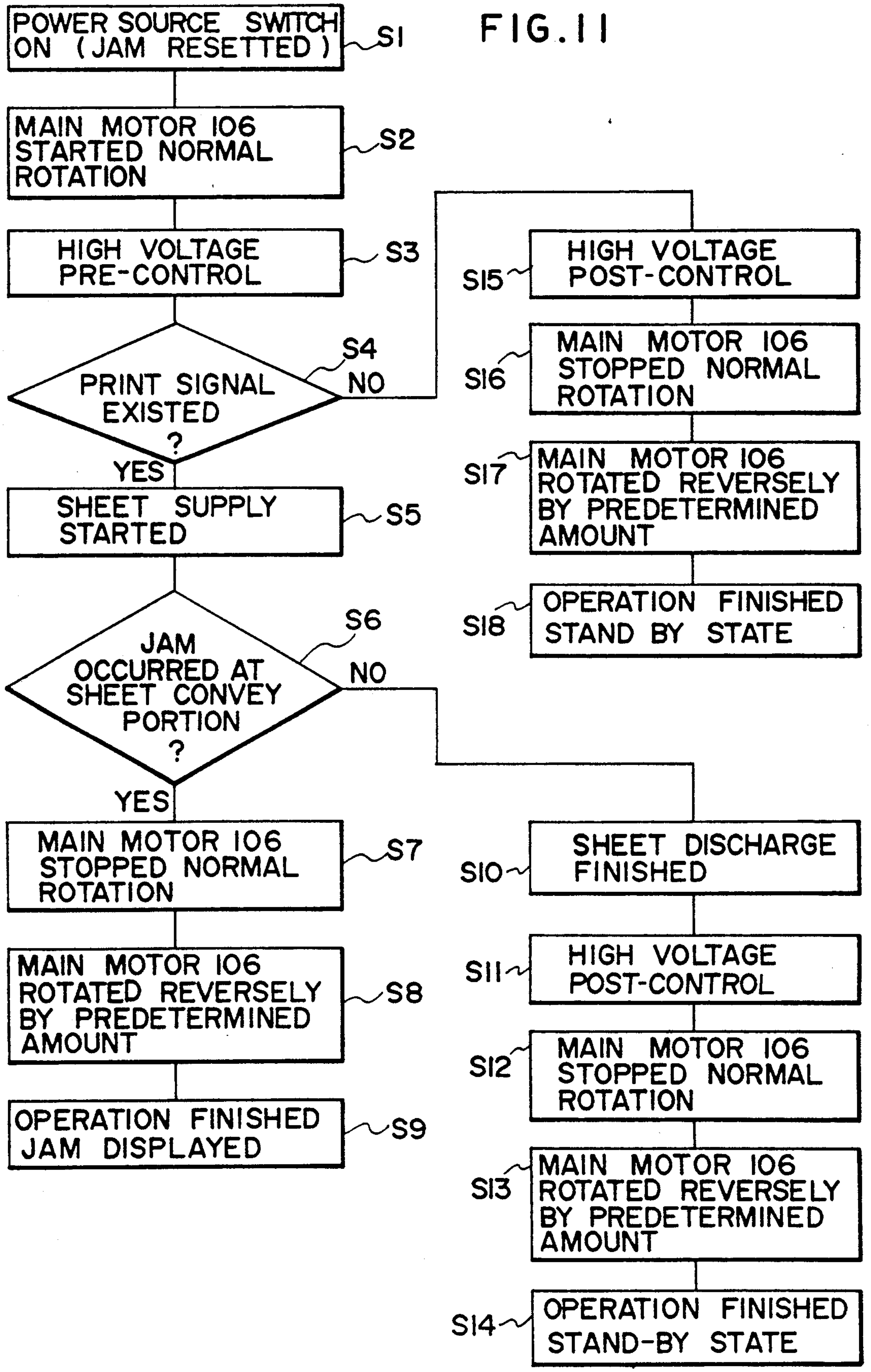
FIG. 11 is flow chart showing another operation in the embodiment of the present invention.
Figure 12:
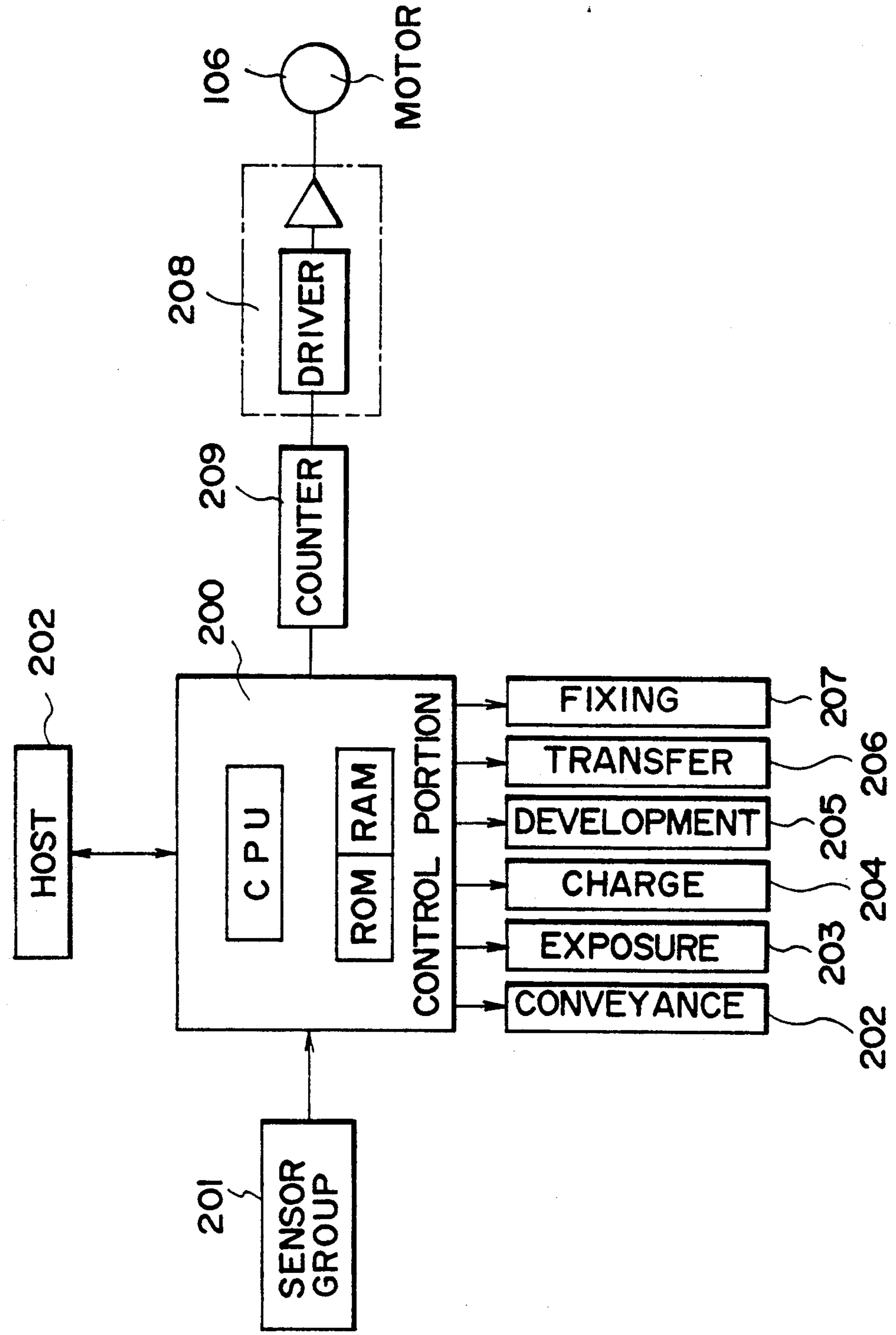
FIG. 12 is a block diagram according to a preferred embodiment of the present invention.

In FIG. 12, a control portion 200 serves to control the whole system and includes a CPU such as a microcomputer, a ROM for storing the CPU control program indicated, for example, by the flow charts in FIGS. 10 and 11 and various data, a RAM used as a work area for the CPU and adapted to temporarily store the various data, and the like.

The control portion 200 receives a signal, for example, from a sensor group 201 including sheet sensors. Further, the control portion further receives image information from a host 202 such as a computer, word processor and the like. On the basis of such signals and information, the control portion 200 controls various process steps such as exposure 203, charge 204, development 205, transfer 206 and fixing 207, and a recording sheet conveyor means 202. Further, the control portion 200 controls the drive motor 106 via the counter 209, which counts the number of pulses applied from the control portion 200, to a driver 208.

Next, the above-mentioned laser beam printer 101 will be fully described with reference to FIG. 13.

Figure 13:
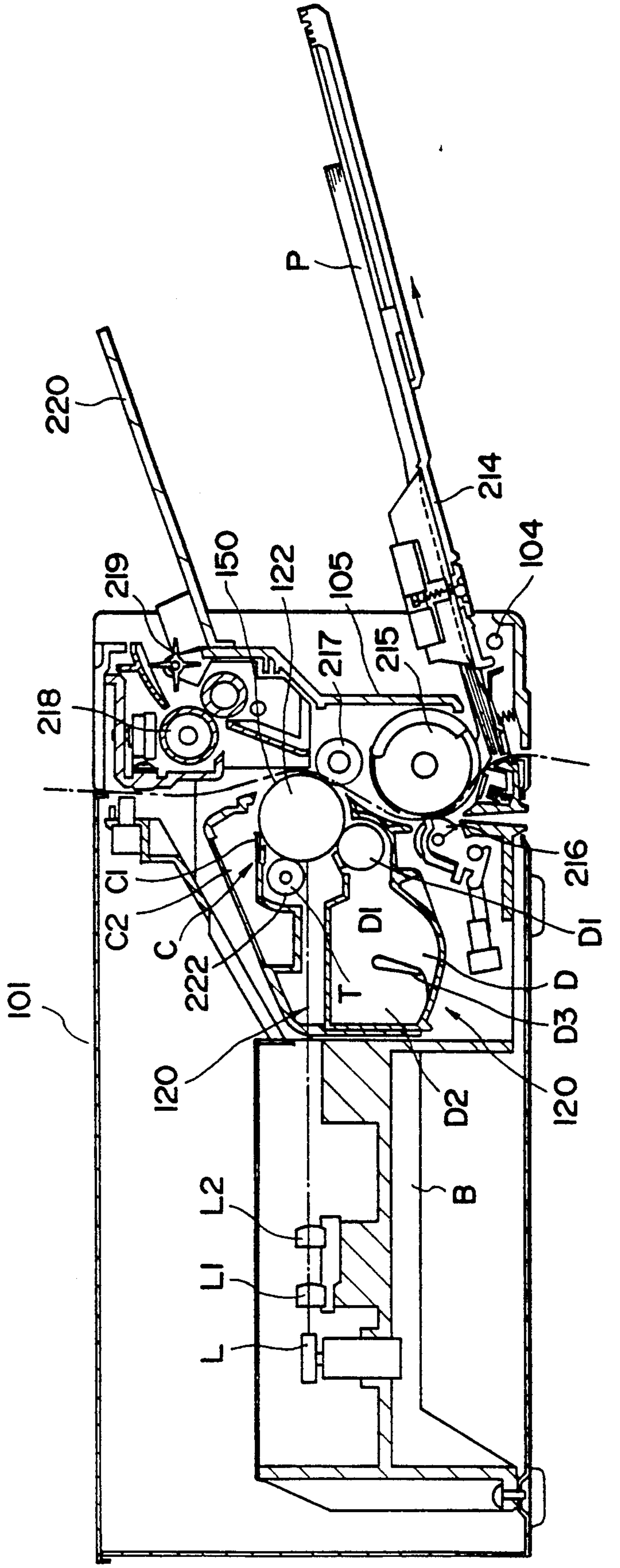
FIG. 13 is an elevational sectional view of a laser beam printer according to the preferred embodiment of the present invention.

FIG. 13 is an elevational sectional view of the laser beam printer 101. In the laser beam printer 101, a plurality of cut sheets (recording sheets) P are stacked on a sheet supply tray 214. Each cut sheet P is conveyed to the photosensitive drum 122 constituting an image forming portion via sheet supply roller 215 and a feed roller 216. Thereafter, an image formed on the photosensitive drum 122 is transferred onto the cut sheet by means of a transfer charger 217. Then, the cut sheet is sent to a fixing device 218, where the image is permanently fixed to the sheet with heat. Thereafter, the sheet is ejected onto an ejection tray 220 out of the printer by ejector rollers 219. Incidentally, the fixing device 218 includes a heat roller 218*a* and a pressure roller 218*b*.

The outer cover 105 incorporating thereon a sheet supply portion including the sheet supply tray 214 and the sheet supply roller 215, a conveying portion including the feed roller 216, a fixing portion including the fixing device 218, and ejector rollers 219 and the ejection tray 220 is pivotally mounted on a base B of the printer via the pivot pins 104, so that the cover can be opened to separate it from the printer body along the chain and dot line.

Further, the image forming portion is constituted by the above-mentioned process cartridge 120 incorporating therein the photosensitive drum 122, cleaner C, primary charger T and developing station D. Incidentally, the cleaner C comprises a cleaning blade C1 and a waste toner reservoir C2. Further, the developing station D includes a developing sleeve D1, a toner reservoir D2 and a toner agitating blade D3. The primary charger T can charge the photosensitive drum 122 by applying the electric bias to a semiconductor elastic body such as a conductive rubber roller 222. Incidentally, the conductive rubber roller 222 is urged against the photosensitive drum 122 with a pressure of the order of several hundreds $g/cm^2$ and is driven synchronously with the rotation of the photosensitive drum. Incidentally, in FIG. 13, the symbol L denotes a polygonal mirrors; and L1, L2 denote focusing lenses.

The exchange of the process cartridge 120 is effected as follows. That is to say, as mentioned above, when the outer cover 105 including the sheet supply portion, conveying portion, fixing portion and ejecting portion is opened, the process cartridge 120 can be retracted or inserted along the direction that the outer cover 105 is opened. Thus, the operator can retract the process cartridge in a direction perpendicular to the generatrix of the drum. Further, a new process cartridge 120 can be mounted within the printer in a reverse manner regarding the above-mentioned dismounting operation of the cartridge. After the cartridge is mounted, when the outer cover 105 is closed, the process cartridge is securely brought into a predetermined position by the pressure from the transfer roller 217.

According to the illustrated embodiment, the following advantages can be obtained. In recent compact and light-weighted personal printers, many gears are molded from resin material, and the printer has a smaller number of printing and tends to be left in an inoperative condition for a long time. After the printing operation, when the printer is left in the inoperative condition for a long time, the stress on the gear teeth generated at the meshing area between the gears for transmitting the torque during the normal printing operation induces creep in the resin gear teeth to deform the gears. As a result, regardless of the number of printing operations, it is feared that the deformation gears causes an unevenness in rotation, thus exerting a bad influence upon the image quality. To the contrary, according to the illustrated embodiment of the present invention, whenever the printing operation is finished, the reverse rotation of the main motor can release the stress on the gear teeth. Thus, even when the gears are made of resin, it is possible to prevent creep deformation of the gears, thus preventing the uneven rotation of the gears. Further, according to the illustrated embodiment, in a process cartridge mountable on an image forming system wherein when the process cartridge is mounted within the image forming system the driven gear of the process cartridge is meshed with the drive gear of the image forming system and the process cartridge is driven by rotating the drive gear by means of the drive motor, since the drive motor is controlled so as to be rotated reversely by the predetermined amount before it is stopped, it is possible to easily dismount the process cartridge and to securely hold the process cartridge in the positioned location in the image forming system during the normal image forming operation, with a simple construction and without increased cost.

Incidentally, the above-mentioned process cartridge integrally includes therein an image bearing member such as an electrophotographic photosensitive member, and at least one type of process means such as a charger means, a developing means and a cleaning means, as a unit which can be removably mounted within an image forming system. More specifically, the process cartridge integrally incorporates therein a charger means, a developing means or a cleaning means, and an electrophotographic photosensitive member, as a unit which can be removably mounted within an image forming system; or integrally incorporates therein at least one of a charger means, a developing means and a cleaning means, and an electrophotographic photosensitive member, as a unit which can be removably mounted within an image forming system; or integrally incorporates therein at least a developing means and an electrophotographic photosensitive member, as a unit which can be removably mounted within an image forming system. The image forming system may be an electrophotographic copying machine, laser beam printer (LBP), or the like.

As mentioned above, according to the present invention, it is possible to provide a process cartridge drive mechanism and an image forming system, which can remarkably improve the mounting and dismounting operability of the process cartridge with low cost.

What is claimed is:

1. A process cartridge drive mechanism for driving a process cartridge which is mountable to a main body of an image forming apparatus, said process cartridge drive mechanism comprising:

a drive motor which is forwardly and reversely rotatable;

drive force transmitting means for transmitting a drive force of said drive motor to the process cartridge, said drive force transmitting means having a range of play therein; and control means for controlling a rotation of said drive motor such that said drive motor is rotated reversely within the range of play of said drive force transmitting means before said drive motor is stopped.

2. A process cartridge drive mechanism according to claim 1, wherein the reverse rotation of said drive motor before stopping is effected when a normal image forming operation is finished.

3. A process cartridge drive mechanism according to claim 1, wherein the reverse rotation of said drive motor before stopping is effected when the image forming apparatus is stopped due to an abnormal operating condition.

4. A process cartridge drive mechanism according to claim 1, wherein said drive force transmitting means includes a gear having a range of play in a reverse direction so that said gear does not rotate reversely upon the reverse rotation of said drive motor.

5. A process cartridge drive mechanism according to claim 1, wherein said drive motor comprises a stepping motor.

6. A process cartridge drive mechanism according to claim 1, wherein said drive force transmitting means has a drive gear, and wherein the process cartridge includes a photosensitive drum having a drum gear provided on one end thereof, said drive gear being meshed with the drum gear to transmit the driving force to the photosensitive drum to rotate the photosensitive drum.

7. A process cartridge drive mechanism according to claim 1, wherein said drive force transmitting means includes a gear provided with an elongated hole, and a drive shaft having a pin movably positioned within the elongated hole, said gear being capable of moving, relative to said drive shaft, over a range in which said pin can move within the elongated hole.

8. A process cartridge drive mechanism according to claim 1, further comprising a photosensitive drum having a drum gear provided at an end portion thereof, wherein the process cartridge receives the drive force from said drive force transmitting means at said drum gear.

9. An image forming apparatus for forming an image on a recording medium, said image forming apparatus comprising:

mount means for mounting a process cartridge which includes an image bearing member and process means acting on said image bearing member;

a drive motor which is forwardly and reversely rotatable;

drive force transmitting means for transmitting a drive force of said drive motor to said process cartridge mounted to said mount means, said drive force transmitting means having a range of play therein; and control means for controlling a rotation of said drive motor such that said drive motor is rotated reversely within the range of play of said drive force transmitting means before said drive motor is stopped.

10. An image forming apparatus according to claim 9, wherein the reverse rotation of said drive motor before stopping is effected when a normal image forming operation is finished.

11. An image forming apparatus according to claim 9, wherein the revere rotation of said drive motor before stopping is effected when said image forming apparatus is stopped due to an abnormal operating condition.

12. An image forming apparatus according to claim 9, wherein said drive force transmitting means has a gear having a range of play in a reverse direction so that said gear does not rotate reversely upon the reverse rotation of said drive motor.

13. An image forming apparatus according to claim 9, wherein said drive motor comprises a stepping motor.

14. An image forming apparatus according to claim 9, wherein said drive force transmitting means has a drive gear, and wherein said process cartridge includes a photosensitive drum having a drum gear provided on one end thereof, said drive gear being meshed with the drum gear to transmit the driving force to said photosensitive drum to rotate said photosensitive drum.

15. An image forming apparatus according to claim 9, wherein said image bearing member comprises a photosensitive drum.

16. An image forming apparatus according to claim 9, wherein said image bearing member comprises a photosensitive drum, and wherein said process means includes a cleaning means for removing toner remaining on a peripheral surface of said photosensitive drum.

17. An image forming apparatus according to claim 9, wherein said image bearing member comprises a photosensitive drum, and wherein said process means includes charger means for charging said photosensitive drum.

18. An image forming apparatus according to claim 9, wherein said image bearing member comprises a photosensitive drum, and wherein said process means includes developing means for developing a latent image formed on said photosensitive drum.

19. An image forming apparatus according to claim 9, wherein said process cartridge comprises an integral unit including (i) charger means, (ii) at least one of developing means and cleaning means, and (iii) an electrophotographic photosensitive member, said process cartridge being removably mounted within said image forming apparatus.

20. An image forming apparatus according to claim 9, wherein said process cartridge comprises an integral unit including (i) at least one of charger means, developing means, and cleaning means, and (ii) an electrophotographic photosensitive member, said process cartridge being removably mounted within said image forming apparatus.

21. An image forming apparatus according to claim 9, wherein said process cartridge comprises an integral unit including developing means and an electrophotographic photosensitive member, said process cartridge being removably mounted within said image forming apparatus.

22. An image forming apparatus according to claim 9, wherein said drive force transmitting means includes a gear provided with an elongated hole, and a drive shaft having a pin movably positioned within the elongated hole, said gear being capable of moving, relative to said drive shaft, over a range in which said pin can move within the elongatęd hole.

23. An image forming apparatus according to claim 9, wherein said image bearing member comprises a photosensitive drum having a drum gear provided at an end portion thereof, wherein said process cartridge receives the drive force from said drive force transmitting means at said drum gear.

24. A process cartridge drive mechanism for driving a process cartridge which is removably mounted to a main body of an image forming apparatus, said process cartridge drive mechanism comprising:

a driven gear provided on the process cartridge;

a driving gear, provided on the main body of the image forming apparatus, for meshing with said driven gear to drive the process cartridge in a drive rotational direction, said driving gear having a range of play in a reverse rotational direction; and a drive motor, forwardly and reversely rotatable, for driving said driving gear by a rotation of said drive motor, said drive motor being rotated reversely by a predetermined amount within the range of play of said driving gear before said drive motor is stopped.

25. A process cartridge drive mechanism according to claim 24, wherein said driving gear does not rotate when said drive motor is rotated reversely by the predetermined amount.

26. A process cartridge drive mechanism according to claim 25, wherein the reverse rotation of said drive motor before stopping is effected every time an abnormal image forming operation is finished.

27. A process cartridge drive mechanism according to claim 25, wherein the reverse rotation of said drive motor before stopping is effected every time said image forming apparatus is stopped due to a jam.

28. A process cartridge drive mechanism according to claim 24, wherein the reverse rotation of said drive motor before stopping is effected every time a normal image forming operation is finished.

29. A process cartridge drive mechanism according to claim 28, wherein the reverse rotation of said drive motor before stopping is effected every time said image forming apparatus is stopped due to a jam.

30. A process cartridge drive mechanism according to claim 24, wherein the reverse rotation of said drive motor before stopping is effected every time said image forming apparatus is stopped due to a jam.

* * * * *

UNITED STATES PATENT AND TRADEMARK OFFICE

CERTIFICATE OF CORRECTION

PATENT NO. : 5,280,224

DATED : January 18, 1994

INVENTOR(S) : SEIJI SAGARA

It is certified that error appears in the above-indentified patent and that said Letters Patent is hereby corrected as shown below:

COLUMN 2

Line 34, "provide" should read --to provide--.
Line 40, "smallsized" should read --small-sized--.

COLUMN 4

Line 7, "A" should read --An--.

COLUMN 6

Line 27, "abnormity" should read --abnormality--.
Line 39, "abnormity" should read --abnormality--.

COLUMN 7

Line 11, "abnormity" should read --abnormality--.

COLUMN 8

Line 51, "mirrors;" should read --mirror;--.

COLUMN 9

Line 1, "light-weighted" should read --light-weight--.
Line 3, "printing" should read --printing operations--.

UNITED STATES PATENT AND TRADEMARK OFFICE

CERTIFICATE OF CORRECTION

PATENT NO. : 5,280,224

DATED : January 18, 1994

INVENTOR(S) : SEIJI SAGARA

It is certified that error appears in the above-indentified patent and that said Letters Patent is hereby corrected as shown below:

COLUMN 9, Line 11, "deformation" should read --deformation of the--.

Signed and Sealed this

Twelfth Day of July, 1994

Attest:

BRUCE LEHMAN

*Attesting Officer* *Commissioner of Patents and Trademarks*